United States Patent
Yang et al.

(10) Patent No.: US 9,028,681 B2
(45) Date of Patent: May 12, 2015

(54) DRAINAGE DEVICE FOR CLOSED CHAMBER CONTAINING LIQUID

(75) Inventors: Ming-Lu Yang, New Taipei (TW); Ya-Dong Zhang, Shenzhen (CN); Gao-Feng Du, Shenzhen (CN); Yue Li, Shenzhen (CN)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 720 days.

(21) Appl. No.: 13/242,006

(22) Filed: Sep. 23, 2011

(65) Prior Publication Data
US 2013/0015116 A1    Jan. 17, 2013

(30) Foreign Application Priority Data
Jul. 11, 2011   (CN) .......................... 2011 1 0192160

(51) Int. Cl.
| | |
|---|---|
| *E02B 15/04* | (2006.01) |
| *F04B 1/04* | (2006.01) |
| *E03F 1/00* | (2006.01) |
| *F04B 53/12* | (2006.01) |
| *B01D 35/26* | (2006.01) |
| *B01D 36/00* | (2006.01) |

(52) U.S. Cl.
CPC .............. *F04B 1/0426* (2013.01); *E03F 1/006* (2013.01); *B01D 35/26* (2013.01); *B01D 36/003* (2013.01); *F04B 53/123* (2013.01)

(58) Field of Classification Search
None
See application file for complete search history.

(56) References Cited

U.S. PATENT DOCUMENTS

| | | | |
|---|---|---|---|
| 2,256,145 A * | 9/1941 | Hock ............................. | 210/445 |
| 2,338,418 A * | 1/1944 | Forrest et al. ................. | 210/412 |
| 5,178,752 A * | 1/1993 | McKinnon .................... | 210/121 |
| 5,620,314 A * | 4/1997 | Worton .......................... | 417/550 |
| 5,771,935 A * | 6/1998 | Myers ............................ | 137/859 |
| 8,216,462 B2 * | 7/2012 | O'Brien et al. ............... | 210/200 |

* cited by examiner

*Primary Examiner* — Terry Cecil
(74) *Attorney, Agent, or Firm* — Novak Druce Connolly Bove + Quigg LLP

(57) ABSTRACT

A drainage device for draining liquid out of a closed chamber includes a main body, a piston assembly, and a transmission assembly. The main body defines a receiving chamber and a liquid inlet communicating with the receiving chamber to the closed chamber. The piston assembly is fixed in the receiving chamber of the main body. The transmission assembly is partially received in the receiving chamber. The transmission assembly and the piston assembly cooperatively separate the receiving chamber to a first chamber adjacent to the liquid inlet and a second chamber away from the liquid inlet. The transmission assembly is slidably received in the receiving chamber, thereby causing air pressure differences between the first chamber and the second chamber, to pump the liquid from the closed chamber to the second chamber. The main body further defines a plurality of discharge holes for draining liquid out of the second chamber.

17 Claims, 2 Drawing Sheets

DRAINAGE DEVICE FOR CLOSED CHAMBER CONTAINING LIQUID

CROSS-REFERENCE TO RELATED APPLICATIONS

This application is related to two co-pending U.S. patent applications, which are: application Ser. No. 13/242,011, application Ser. No. 13/242,026, and all entitled "DRAINAGE DEVICE FOR CLOSED CHAMBER CONTAINING LIQUID". In the aforementioned co-pending applications, the inventors are Yang et al. Such co-pending applications have the same assignee as the present application. The disclosure of the above identified applications are incorporated herein by reference.

BACKGROUND

1. Technical Field

The present disclosure generally relates to drainage devices, and particularly, to a drainage device for draining liquid out of a closed chamber.

2. Description of the Related Art

In the discharging of sewage, sewage is generally sucked into a container to be purified by a sewage suction cleaner, and is then discharged to the outside. The sewage suction cleaner includes a closed chamber and an air pump. The closed chamber achieves a certain degree of vacuum by using the air pump. Under the air pressure, the sewage is pushed into the closed chamber. However, when discharging the sewage, outside air will flow into the closed chamber via a sewage discharging outlet, and thus the degree of vacuum obtained of the closed chamber is decreased. As a result, the air pressure difference between the inside and the outside of the closed chamber is decreased, and sewage is not forced into the closed chamber as expected.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
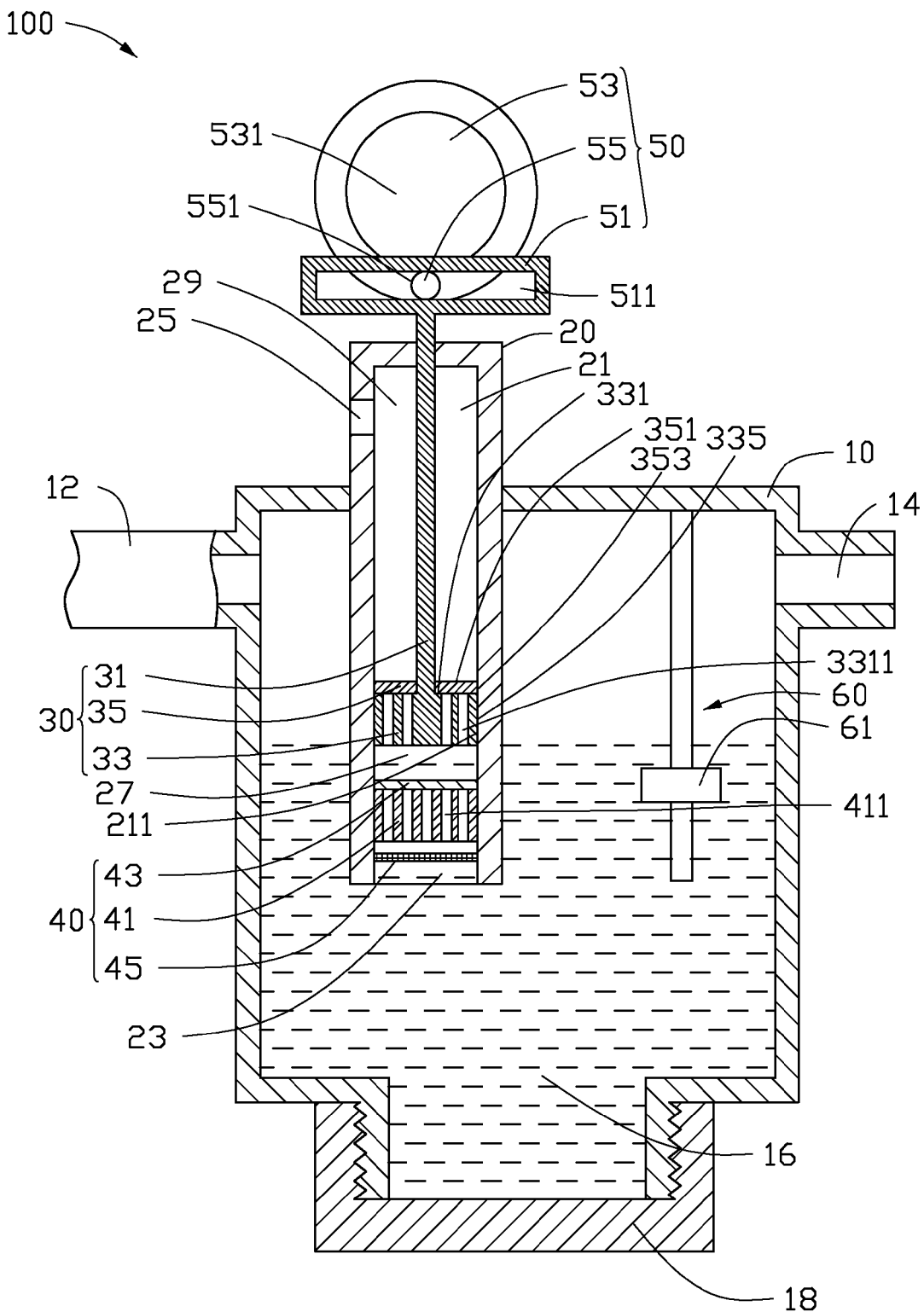
FIG. 1 is a sectional view of an embodiment of a drainage device operating in a first state.

Referring to FIG. 1, an embodiment of a drainage device 100 includes a main body 20, a transmission assembly 30, a piston assembly 40, a drive assembly 50, and a controller 60. In the illustrated embodiment, the drainage device 100 extracts liquid from a closed chamber 10. The closed chamber 10 defines a fluid channel 12 and a gas channel 14 in the top end, and a slag discharge hole 16 in a bottom end thereof. The closed chamber 10 further includes a sealing cover 18 for sealing the slag discharge hole 16. The fluid channel 12 is used for liquid flow, and is equipped with a flow control valve (not shown). The gas channel 14 is connected to an air pump (not shown) for producing a certain degree of vacuum in the closed chamber 10.

The main body 20 is substantially cylindrical, and defines a receiving chamber 21. One end of the main body 20 defines a liquid inlet 23 communicating with the receiving chamber 21, and the other end of the main body 20 is closed. The main body 20 further defines a plurality of liquid discharge holes 25 in a sidewall 211 thereof. The liquid inlet 23 is below the level of the liquid in the closed chamber 10. The liquid in the receiving chamber 21 may be discharged outside the closed chamber 10 via the liquid discharge holes 25. The transmission assembly 30 includes a connecting pole 31 extending out of the main body 20, an action piston 33 fixed to the bottom of the connecting pole 31, and a flexible member 35. The connecting pole 31 is positioned in the receiving chamber 21, and can be moved up and down within the main body 20.

The action piston 33 is cylindrical, and is positioned between the liquid inlet 23 and the liquid discharge holes 25. The action piston 33 moves with the connecting pole 31. The action piston 33 includes a top surface 331 and a sealing surface 335. The sealing surface 335 provides a moving seal against the side surface of the sidewall 211 of the main body 20. Therefore, the receiving chamber 21 is divided into a first chamber 27 adjacent to the liquid inlet 23 and a second chamber 29 communicating with the liquid discharge holes 25. The top surface 331 defines a plurality of permeable holes 3311, so that any liquid in the second chamber 29 can flow to the first chamber 27 via the permeable holes 3311, but the permeable holes 3311 prevent any impurities from moving through the action piston 33. The flexible member 35 is sleeved on the connecting pole 31, and attached to the top surface 331 of the action piston 33. The flexible member 35 has a waterproof surface 351 away from the top surface 331 and a sealing surface 353 touching the side surface of the sidewall 211. The flexible member 35 can deform under the liquid pressure in the first chamber 27, and thus a gap can be formed between the sealing surface 353 and the side surface of the sidewall 211, such that liquid can penetrate through the action piston 33 and flow into the second chamber 29. In the illustrated embodiment, the flexible member 35 is a circular silicone mat.

The piston assembly 40 is positioned in the receiving chamber 21 and adjacent to the liquid inlet 23. The piston assembly 40 includes a fixed piston 41, a flexible member 43, and a filter 45. The flexible member 43 and the filter 45 are positioned on opposite sides of the fixed piston 41, and the flexible member 43 is located closer to the action piston 33.

The fixed piston 41 has a similar structure to that of the action piston 33, and defines a plurality of permeable holes 411. The flexible member 43 has a similar structure to that of the flexible member 35. The flexible member 43 can deform under the liquid pressure in the closed chamber 10, and thus a gap can be formed between the flexible member 43 and the sidewall 211, such that any liquid in the closed chamber 10 can flow into the first chamber 27. The filter 45 is a metal mesh filter, and functions as a large-scaled filtering of the liquid flowing into the first chamber 27.

The drive assembly 50 includes a follower 51 fixed to the top end of the connecting pole 31, a driving member (not shown), a turntable 53 driven to rotate by the driving member, and a drive rod 55 positioned on the turntable 53. In the illustrated embodiment, the follower 51 is substantially rectangular, and defines a restricting groove 511. The follower 51 may be integrally formed with the connecting pole 31. The turntable 53 is adjacent to the follower 51, and a center of the turntable 53 is located on the longitudinal axis of the main body 20. The turntable 53 has a circular flat surface which is substantially coplanar with a side surface of the follower 51, and can be driven to rotate by the driving member.

The drive rod 55 is positioned close to the circumference of the turntable 53, and has a drive end 551. The drive end 551 is slidably engaged in the restricting groove 511 of the follower 51, such that the follower 51 can be moved up and down linearly by the circular motion of the drive rod 55.

The controller 60 includes a sensor 61 positioned beneath the surface of the liquid of the closed chamber 10. The controller 60 receives a signal for detecting the level of any liquid in the closed chamber 10 from the sensor 61 and determines the movements of the drive assembly 50.

In assembly of the drainage device 100, the flexible member 43 is attached to the fixed piston 41, and the fixed piston 41 and the flexible member 43 are positioned together in the main body 20 above the liquid inlet 23. The fixed piston 41 is fixed in the main body 20. The filter 45 is fixed above the liquid inlet 23 of the main body 20. The flexible member 35 and the action piston 33 are sleeved in turn on the connecting pole 31, with the flexible member 35 attached to the top surface 331 of the action piston 33. The main body 20 is positioned in the closed chamber 10, with the liquid inlet 23 positioned below the minimum level of the liquid. The flexible member 35 and the action piston 33 are inserted into the receiving chamber 21 of the main body 20, and the receiving chamber 21 is thus divided into a first chamber 27 and a second chamber 29. The drive rod 55 is slidably engaged in the restricting groove 511 of the follower 51.

Figure 2:
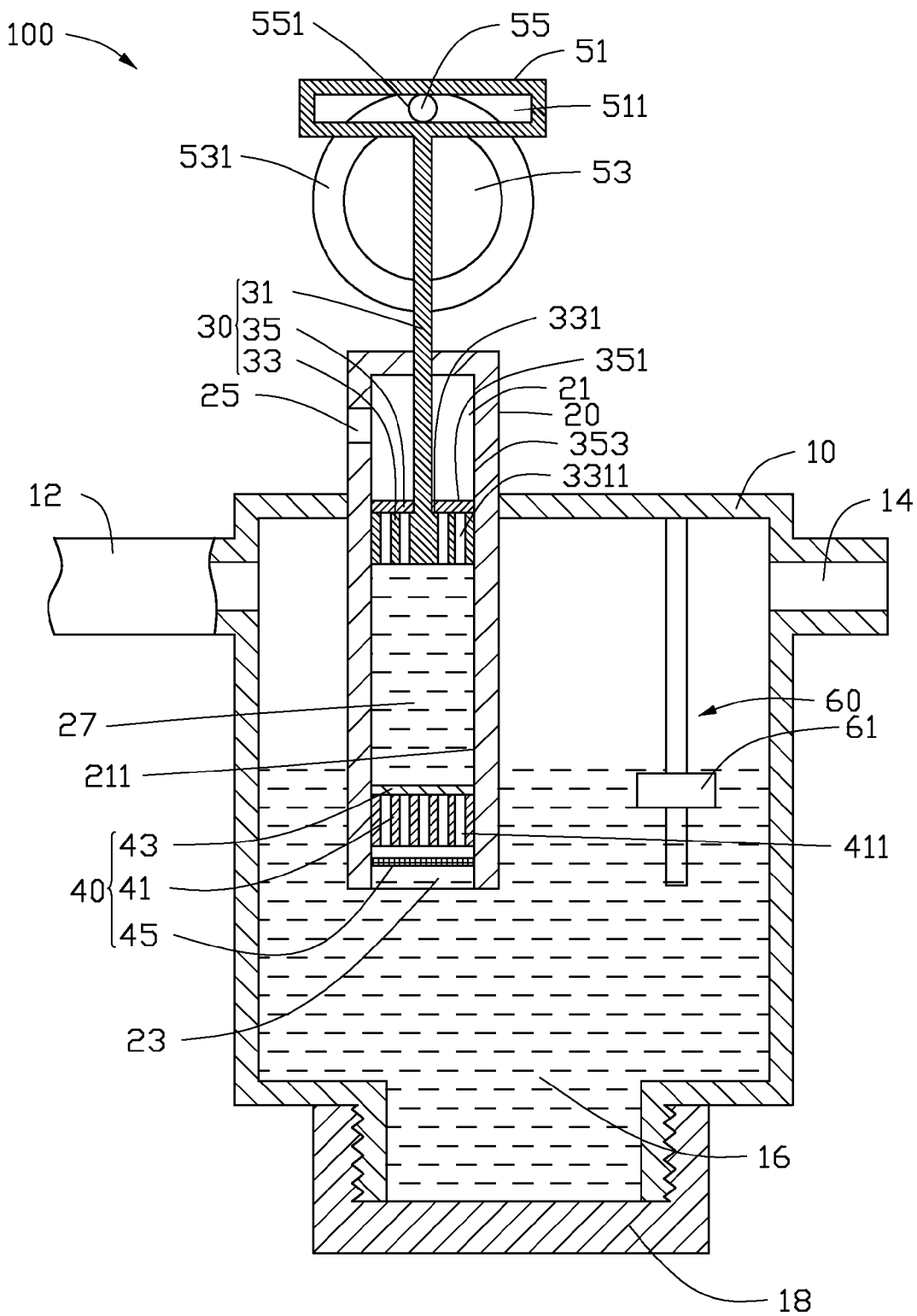
FIG. 2 is a sectional view of the drainage device of FIG. 1 operating in a second state.

Referring to FIGS. 1 and 2, in use, the closed chamber 10 is subjected to a predetermined degree of vacuum via the air pump, and the liquid is sucked into the closed chamber 10 via the fluid channel 12. When the liquid level in the closed chamber 10 is below a predetermined level, the driving member does not work, and the follower 51 does not move. The action piston 33 and the flexible member 35 are located in the receiving chamber 21, and are adjacent to the liquid inlet 23, thereby arriving at the first state of the drainage device 100 as shown in FIG. 1.

When the liquid level in the closed chamber 10 exceeds a predetermined level, the sensor 61 detects the level of the liquid and thereby generates a signal. The controller 60 transmits the signal to the driving member, and then the driving member drives the turntable 53 to rotate. The drive rod 55 drives the follower 51 to rotate about the center of the turntable 53, and simultaneously, the drive rod 55 slides in the restricting groove 511 of the follower 51, such that the connecting pole 31 is constantly sliding in a reciprocating manner.

When the follower 51 together with connecting pole 31 move upwards, the action piston 33 and the flexible member 35 slide in the receiving chamber 21 away from the liquid inlet 23. When the drive rod 55 rotates to the top of the turntable 53, the drive end 551 is located at the middle portion of the follower 51, and is aligned with the connecting pole 31 in a straight line. The action piston 33 and the flexible member 35 have moved a maximum distance upward relative to the piston assembly 40, and the drainage device 100 is thus arriving in the second state as shown in FIG. 2.

When the drainage device 100 transitions from the first state to the second state, the connecting pole 31 together with the action piston 33 and the flexible member 35 move upward in the receiving chamber 21, therefore, the volume of the first chamber 27 increases, thereby correspondingly reducing the air pressure in the first chamber 27. Therefore, an air pressure difference is generated between the first chamber 27 and the closed chamber 10, and thus the flexible member 43 is deformed under the air or liquid pressure. Therefore, a gap is generated between the flexible member 43 and the side wall 211 of the main body 20, such that the liquid in the closed chamber 10 moves through the filter 45 and the fixed piston 41, and is sucked into the first chamber 27 because of the negative air pressure. Simultaneously, an air pressure difference is also created, between the lower air pressure in the first chamber 27, and the normal air pressure in the second chamber 29. The flexible member 35 is pressed down on the action piston 33 and the sidewall 211 of the main body 20 under the air pressure difference, and thus the liquid in the first chamber 27, found in the first state, cannot flow to the second chamber 29. When the drainage device 100 reaches the second state, the first chamber 27 is filled with liquid, and the flexible member 43 is pressed to be flatten, therefore, the liquid cannot escape again to the closed chamber 10 and is sealed in the first chamber 27.

When the drainage device 100 transitions again from the second state to the first state, the connecting pole 31 together with the action piston 33 and the flexible member 35 move downwards in the receiving chamber 21, thereby creating higher pressure in the first chamber 27 and thus deformation of the flexible member 35. The liquid in the first chamber 27 is pumped into the second chamber 29 under the higher pressure. Then, on the next upward stroke of the connecting pole 31, the liquid in the second chamber 29 will drain out of the second chamber 29 via the liquid discharge holes 25, as the flexible member 35 is pressed flat by the weight of the liquid in the second chamber 29.

As the drainage device 100 continuously moves or transitions between the first state and the second state, the liquid in the closed chamber 10 is drained to the outside. When the liquid level in the closed chamber 10 falls again below the predetermined level, the sensor 61 detects the level of the liquid, and thereby generates a closing signal. The controller 60 transmits the closing signal to the driving member, and then the drainage device 100 stops working. In addition, if there is some sediments which have accumulated at the bottom of the closed chamber 10, the sealing cover 18 can be opened to discharge the sediments from the closed chamber 10.

The flexible member 35 prevents the ingress of outside air into the first chamber 27. That is, outside air cannot reach the inside of the closed chamber 10 when the liquid is being drained to the outside.

A center portion of the flexible member 35 may be made of metal and integrally formed with the connecting pole 31, and a circumferential portion of the flexible member 35 made of flexible material to allow deformation. This type of flexible member can have a longer service life, and assist in preventing any axial deviation by the connecting pole 31 due to exertions of lateral forces. The drive assembly 50 may be replaced by a linear drive motor, which can drive the connecting pole 31 to move in a straight line. In addition, the main body 20 may define any number of discharge holes 25.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A drainage device for draining liquid out of a closed chamber, comprising:
   a main body defining a receiving chamber and a liquid inlet communicating with the receiving chamber to the closed chamber;
   a piston assembly fixed in the receiving chamber of the main body, the piston assembly comprising a fixed piston and a flexible member located at a side of the fixed piston away from the liquid inlet, the fixed piston defining a plurality of permeable holes, the flexible member configured to deform under liquid pressure in the closed chamber;

a transmission assembly partially received in the receiving chamber, the transmission assembly and the piston assembly cooperatively separating the receiving chamber into a first chamber adjacent to the liquid inlet and a second chamber away from the liquid inlet, the transmission assembly comprising an action piston and a flexible member located at a side of the action piston away from the piston assembly, the action piston defining a plurality of permeable holes, the action piston of the transmission assembly substantially cylindrical and comprising a top surface and a sealing surface, the sealing surface providing a moving seal against a sidewall of the main body, the flexible member of the transmission assembly attached to the top surface of the action piston, the flexible member having a waterproof surface away from the top surface and a sealing surface touching the sidewall of the main body, the flexible member of the transmission assembly configured to deform under liquid pressure in the first chamber;

wherein the flexible member of the transmission assembly is a silicone mat, the transmission assembly is slidably received in the receiving chamber, thereby adjusting air pressure in the first chamber and the second chamber, to pump the liquid from the closed chamber to the first chamber, and then pump the liquid from the first chamber to the second chamber, and the main body further defines at least one discharge hole for draining liquid out of the second chamber.

2. The drainage device of claim 1, wherein the transmission assembly comprises a connecting pole extending out of the main body, the action piston is fixed to an end of the connecting pole, and the flexible member of the transmission assembly is substantially circular and sleeved on the connecting pole and attached to the action piston.

3. The drainage device of claim 2, further comprising a driving assembly, wherein the drive assembly comprises a follower fixed to an end of the connecting pole extending out of the main body, a turntable, and a drive rod positioned on the turntable, the drive rod is slidably engaged to the follower.

4. The drainage device of claim 3, wherein the follower defines a restricting groove, and the drive rod has a drive end slidably received in the restricting groove.

5. The drainage device of claim 1, wherein the fixed piston is fixed in the receiving chamber, the flexible member of the piston assembly is attached to the fixed piston and opposite to the transmission assembly, the flexible member of the piston assembly has a similar structure to that of the flexible member of the transmission assembly.

6. The drainage device of claim 5, wherein the piston assembly further comprises a filter fixed in the receiving chamber and opposite to the fixed piston.

7. The drainage device of claim 1, further comprising a controller, wherein the controller has a sensor for detecting liquid level in the closed chamber, and controls the movement of the drive assembly.

8. The drainage device of claim 1, wherein the closed chamber defines a fluid channel and a gas channel in a top end, and a slag discharge hole in a bottom end thereof.

9. The drainage device of claim 8, wherein the closed chamber further includes a sealing cover for sealing the slag discharge hole.

10. A drainage device, comprising:
a main body defining a receiving chamber, a liquid inlet, and at least one discharge hole, the liquid inlet and the at least one discharge hole are at opposite sides of the receiving chamber, and communicating with the receiving chamber;
a piston assembly fixed in the receiving chamber of the main body, the piston assembly comprising a fixed piston and a flexible member located at a side of the fixed piston away from the liquid inlet, the fixed piston defining a plurality of permeable holes, the flexible member configured to deform under liquid pressure in the closed chamber;
a transmission assembly slidably received in the receiving chamber, the transmission assembly and the piston assembly cooperatively separating the receiving chamber into a first chamber adjacent to the liquid inlet and a second chamber communicating with the at least one discharge hole, the transmission assembly comprising an action piston and a flexible member located at a side of the action piston away from the piston assembly, the action piston defining a plurality of permeable holes, the action piston of the transmission assembly substantially cylindrical and comprising a top surface and a sealing surface, the sealing surface providing a moving seal against a sidewall of the main body, the flexible member of the transmission assembly attached to the top surface of the action piston, the flexible member having a waterproof surface away from the top surface and a sealing surface touching the sidewall of the main body, the flexible member of the transmission assembly configured to deform under liquid pressure in the first chamber;
wherein the flexible member of the transmission assembly is a silicone mat, the transmission assembly slides in the receiving chamber, thereby adjusting air pressure in the first chamber and the second chamber.

11. The drainage device of claim 10, wherein the transmission assembly comprises a connecting pole extending out of the main body, the action piston is fixed to an end of the connecting pole, and the flexible member of the transmission assembly is substantially circular and sleeved on the connecting pole and attached to the action piston.

12. The drainage device of claim 11, further comprising a driving assembly, wherein the drive assembly comprises a follower fixed to an end of the connecting pole extending out of the main body, a turntable, and a drive rod positioned on the turntable, the drive rod is slidably engaged to the follower.

13. The drainage device of claim 12, wherein the follower defines a restricting groove, and the drive rod has a drive end slidably received in the restricting groove.

14. The drainage device of claim 10, wherein a center portion of the flexible member of the transmission assembly is made of metal, and an circumferential portion of the flexible member is made of flexible material.

15. The drainage device of claim 10, wherein the fixed piston is fixed in the receiving chamber, the flexible member of the piston assembly is attached to the fixed piston and opposite to the transmission assembly, the flexible member of the piston assembly has a similar structure to that of the flexible member of the transmission assembly.

16. The drainage device of claim 15, wherein the piston assembly further comprises a filter fixed in the receiving chamber and opposite to the fixed piston.

17. The drainage device of claim 10, further comprising a controller, wherein the controller has a sensor for detecting liquid level, and controls the movement of the drive assembly.

* * * * *